United States Patent [19]
Bredol et al.

[11] Patent Number: 6,013,314
[45] Date of Patent: Jan. 11, 2000

[54] MANUFACTURE OF A PHOSPHOR COMPOSITION WITH HEMATITE

[75] Inventors: Michael Bredol; Jacqueline Merikhi; Dieter Wädow; Irmgard Köhler, all of Aachen, Germany

[73] Assignee: U.S. Philips Corporation, New York, N.Y.

[21] Appl. No.: 09/122,409

[22] Filed: Jul. 24, 1998

[51] Int. Cl.⁷ .................................................. B05D 7/00
[52] U.S. Cl. ........................ 427/215; 427/157; 427/218; 427/64; 427/68; 427/377
[58] Field of Search .............................. 427/64, 68, 157, 427/215, 218, 378, 377, 380, 2.27

[56] References Cited

U.S. PATENT DOCUMENTS

| | | | |
|---|---|---|---|
| 3,946,102 | 3/1976 | Hund | 423/633 |
| 4,209,567 | 6/1980 | Takahara et al. | 428/402 |
| 4,297,390 | 10/1981 | Franz et al. | 427/64 |
| 4,804,561 | 2/1989 | Tanioka et al. | 427/130 |
| 4,983,573 | 1/1991 | Bolt et al. | 505/1 |
| 5,382,452 | 1/1995 | Bruno et al. | 427/215 |
| 5,387,436 | 2/1995 | Ronda et al. | 427/215 |

FOREIGN PATENT DOCUMENTS

2939258A1  4/1980  Germany .

*Primary Examiner*—Shrive Beck
*Assistant Examiner*—Paul D. Strain
*Attorney, Agent, or Firm*—Norman N. Spain

[57] ABSTRACT

A method of manufacturing a phosphor composition of a phosphor comprising a pigment coating of hematite, includes a first step in which the phosphor is coated with an iron-containing starting compound for hematite, and a second step, in which the phosphor with the coating is calcined, thereby converting the iron-containing starting compound for hematite into hematite. The calcining operation is carried out in an atmosphere of a gas mixture of water vapor and an oxidizing gas.

5 Claims, 2 Drawing Sheets

MANUFACTURE OF A PHOSPHOR COMPOSITION WITH HEMATITE

BACKGROUND OF THE INVENTION

The invention relates to a method of manufacturing a phosphor composition from a phosphor, in particular a phosphor for color display screens and color monitors, comprising a pigment coating of hematite, said method comprising a first step in which the phosphor is coated with an iron-containing starting compound for hematite, and a second step in which the phosphor with the coating is calcined, thereby converting the iron-containing starting compound into hematite.

Color display screens and color monitors are often employed in bright ambient light. To improve the visibility of the display screen under said ambient-light conditions and to reduce visual fatigue, a display screen should be non-dazzling and its reflection coefficient should be small. In addition, the contrast of the display screen should be as high as possible.

The contrast can be increased by reducing the influence of external light sources relative to the intrinsic light density of the phosphor dots. To this end, the surface of the display screen or the phosphor particles are coated with color filters in the form of inorganic pigments which are selected to be such that they pass as much as possible of the color emitted by the relevant phosphor and absorb the remaining spectral fractions. By virtue of these color filter pigments, the diffuse reflection of external light at the phosphor is suppressed.

To increase the contrast, red-luminescing phosphors are customarily coated with hematite, $\alpha$-$Fe_2O_3$. In the case of red-luminescing europium-doped phosphors, the hematite pigmentation can additionally suitably be used to filter-out undesirable short-wave emission lines. The europium-doped phosphor pigmented with hematite demonstrates a more strongly saturated emission shade.

To adhere hematite to the phosphor particles use can be made of organic or inorganic binders. Alternatively, hematite can be applied to the phosphor powder by means of a process in which the hematite or a suitable starting compound for hematite is directly precipitated onto the phosphor particles. Subsequently, the freshly precipitated hematite or the starting compound for hematite is converted to microcrystalline hematite pigment by means of a heating step. Such a "chemical pigmentation" process, in which the hematite pigment is formed directly on the surface of the phosphor in a chemical process, results in an improved adhesion and hence an improved abrasion resistance of the phosphor composition under the manufacturing conditions for the display screen.

In DE-A-29 39 258, a description is given of a method of manufacturing red-luminescing phosphors with adherent pigment, which method is characterized in that a) in a first step, the phosphor is provided with a starting material which is convertable to a red pigment by calcining, and b) in a second step, the phosphor with the deposited starting material is calcined and the starting material is converted to the corresponding pigment. The starting material for the red pigment can be deposited as an oxide, hydroxide, hydrated oxide or a phosphate of the bivalent or trivalent iron or as a mixture of such compounds. Such a method leads, however, to hematite-coated phosphors having a low LCP-value ("luminescence contrast performance"), because the pigment thus prepared absorbs also in the emission range of the phosphor and insufficiently in the green-blue range of ambient light.

SUMMARY OF THE INVENTION

Consequently, it is an object of the invention to provide a non-aggressive method of manufacturing a phosphor composition from a phosphor comprising hematite, which method yields a phosphor composition comprising a strongly adherent hematite and having a high optical quality.

In accordance with the invention, this object is achieved by a method of manufacturing a phosphor composition from a phosphor comprising a pigment coating of hematite, said method including a first step in which the phosphor is coated with an iron-containing starting compound for hematite, and a second step, in which the phosphor with the coating is calcined, thereby converting the iron-containing starting compound into hematite, in which method the calcining operation is carried out in an atmosphere of a gas mixture of water vapor and an oxidizing gas.

Such a manufacturing process results in a phosphor composition having high LCP-values, i.e. a low absorption in the emission range of the phosphor and complete absorption of the green and green-blue regions of the ambient light. Calcining in a gas mixture of water vapor and an oxidizing gas additionally has a positive effect on the quality of the crystal surfaces of the phosphor and, consequently, also improves the luminescent efficiency. The method is non-aggressive; it causes a reduction of the thermal and mechanical loads on the phosphor, which adversely affect the luminescent efficiency. In addition, it precludes partial reduction of the hematite and hence prevents it from greying.

Within the scope of the invention, it is preferred that the iron-containing starting compound for hematite is an oxide, hydroxide, hydrated oxide, sulphide or phosphate of bivalent or trivalent iron or a mixture of such compounds.

It is further preferred that the oxidizing gas is air, oxygen, nitrogen-oxide containing gases or an oxygen-containing gas mixture.

It is particularly preferred that calcining takes place in an atmosphere comprising a flowing gas mixture.

Customarily, the method is carried out in such a manner that the water-vapor partial pressure in the gas mixture is $\geq 25\%$ of the overall pressure.

It is particularly preferred that the water-vapor partial pressure in the gas mixture ranges from 60 to 80% of the overall pressure.

These and other aspects of the invention will be apparent from and elucidated with reference to the embodiments described hereinafter.

DETAILED DESCRIPTION OF THE INVENTION

Figure 1:
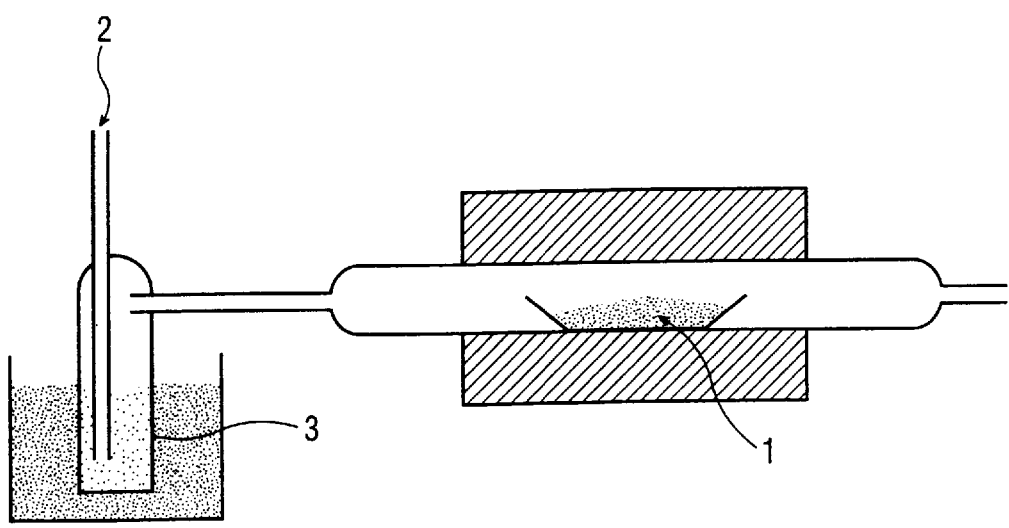
FIG. 1 schematically shows an experimental set-up for the calcining operation in accordance with the invention.

The invention will now be described in greater detail with reference to the figures of the drawing and the embodiments described hereafter.

The method in accordance with the invention is used, in particular, to manufacture phosphor compositions comprising red-luminescent phosphors. For the red-luminescent phosphors use can suitably be made of all customary red-luminescent phosphors, such as $Y_2O_2S$:Eu, $Y_2O_3$:Eu and $YVO_4$.

These phosphors or others are coated with an iron-containing starting compound for hematite. For the iron-containing starting compound use is preferably made of an alkaline iron oxide. Alternatively, however, use can be made of another oxide, hydroxide, hydrated oxide, sulphide or phosphate of bivalent or trivalent iron, or of a mixture of such compounds. This iron-containing starting compound is preferably produced directly on the surface of the phosphor by means of a homogeneous chemical precipitation reaction.

The subsequent calcining operation under slightly oxidizing conditions can be carried out in an apparatus as shown in FIG. 1. A phosphor powder (1) coated with an iron-containing starting compound is spread so as to form a thin layer in a corundum boat or the like, and introduced into a tube which is open on both sides and which is surrounded by a tubular furnace. The atmosphere of a gas mixture comprising water vapor and an oxidizing gas (2) for the calcining operation can be generated by passing the oxidizing gas in a controlled flow through tempered water (3). As a result, the oxidizing gas is saturated with water vapor up to the equilibrium partial pressure. The temperature of the water supply used to moisten the oxidizing gas preferably ranges between 70° C. and 100° C. In this temperature range, the vapor pressure varies between 0.3 and 1 bar. If processing takes place in a closed apparatus at a pressure above atmospheric, the temperature of the water supply for moistening the oxidizing gas may exceed 100° C. The flow velocity is not critical.

Subsequently, the phosphor composition is calcined in the gas mixture according to a customary temperature curve. In said operation, the iron-containing starting compound is converted to microcrystalline hematite pigment.

EXAMPLE 1

A quantity of 200 g of freshly prepared $Y_2O_2S$:Eu-phosphor powder which is freed of melt salt is desagglomerated together with grinding balls composed of nylon rods in an ammoniac solution for 4 hours at pH=9. The grinding balls are sieved out and the pH-value of the suspension is reduced to pH=5 by stirring in diluted nitric acid. Further, a solution is prepared which comprises, in approximately 200 ml water, 13.3 mmol $Fe(NO_3)_3$ 9 $H_2O$, 52.4 mmol oxalic acid and 833 mmol urea. The pH-value of this solution is also set to 5. The iron-oxalato solution thus prepared is added to the phosphor suspension, while stirring vigorously and water is added to obtain a volume of 2 l of the reaction mixture. Subsequently, the suspension is heated to 90° C. and maintained at this temperature for at least 2 hours, while stirring continuously. Subsequently, the coated phosphor is separated by filtration, washed a number of times with deionized water and, finally, dried in air at 120° C. By virtue of this homogeneous precipitation reaction, the phosphor is coated with $Fe(OH)_3$.

The coated phosphor material is fed, in a dry state, into a corundum boat and introduced, in a glass tube, into a tubular furnace. The glass tube is connected to a gas-washing bottle, which is filled with water having a temperature of 90° C. Air is introduced into the gas-washing bottle and the air charged with water vapor is passed over the coated phosphor. The phosphor is heated, in moist air, to 390° C., maintained at this temperature for 2 hours and then cooled. This thermal treatment in an air-water vapor mixture causes $Fe(OH)_3$ to be converted to hematite.

EXAMPLE 2

As described in example 1, the $Y_2O_2S$:Eu phosphor is coated with 0.52% by weight $Fe(OH)_3$ pigment by homogeneous precipitation. The coated phosphor material is fed, in a dry state, into a corundum boat and introduced, in a glass tube, into a tubular furnace. The glass tube is connected to a gas-washing bottle filled with water having a temperature of 80° C. Air is introduced into the gas-washing bottle and the air charged with water vapor is passed over the coated phosphor. The phosphor is heated, in moist air, to 390° C., maintained at this temperature for 2 hours and cooled.

EXAMPLE 3

As described in example 1, the $Y_2O_2S$:Eu phosphor is coated with 0.52% by weight $Fe(OH)_3$ pigment by homogeneous precipitation. The coated phosphor material is fed, in a dry state, into a corundum boat and introduced, in a glass tube, into a tubular furnace. The glass tube is connected to a gas-washing bottle filled with boiling water. Air is introduced into the gas-washing bottle and the air charged with water vapor is passed over the coated phosphor. The phosphor is heated, in moist air, to 390° C., maintained at this temperature for 2 hours and cooled.

COMPARATIVE EXAMPLE

As described in example 1, the $Y_2O_2S$:Eu phosphor is coated with 0.52% by weight $Fe(OH)_3$ pigment by homogeneous precipitation. The coated phosphor material is fed, in a dry state, into a corundum boat and introduced, in a glass tube, into a tubular furnace. Dry air is passed over the coated phosphor. The phosphor is heated to 390° C. in a dry air flow, maintained at this temperature for 2 hours and then cooled.

CHARACTERIZATION

The contrast of a color display tube or color monitor is evaluated by means of the "luminance contrast performance" (LCP). Said LCP is calculated as the quotient of the luminance of a display tube and the root of the diffuse reflection of this tube.

To characterize the pigmented phosphor powder, which has not yet been further processed into a display-screen coating, use is made of the quotient R(6500) of the luminescent efficiency and the root of the diffuse reflection of a specific light source, i.e. the black body radiation of 6500 K, through a thick phosphor coating.

The measurement of the diffuse reflectivity of a thick phosphor powder layer is also used to estimate the absorption capacity of the material. The ratio a/s of the absorption coefficient to the scattering coefficient of the pigmented phosphor powder is measured. This ratio enables the absorption capacity to be directly determined. Consequently, the a/s value at a wavelength of 450 nm, at which the powder exhibits a high degree of absorption, can suitably be used to judge the quality of the phosphor compositions relative to each other.

TABLE 1

Colorimetric data and yield data.

| No. | Observation | x | y | R(6500) | Yield | LCP | a/s (450 nm) |
|---|---|---|---|---|---|---|---|
| 1 | check | 0.669 | 0.326 | 34.44 | 100 | 100 | 1.783 |
| 3 | T = 80° C. | 0.669 | 0.326 | 31.91 | 100.8 | 105 | 2.146 |
| 4 | T = 90° C. | 0.670 | 0.326 | 30.50 | 102.3 | 109 | 2.372 |
| 5 | boiling | 0.669 | 0.326 | 31.22 | 99.2 | 104 | 2.290 |

Table 1 lists the colorimetric and yield data associated with the experiments described in greater detail in the examples and the comparative example. This Table clearly shows that the manufacturing method in accordance with the invention enables the absorption capacity of the phosphor composition to be increased by up to 33% at 450 nm, which results in an increase of the LCP-value of up to 9%.

Figure 2:
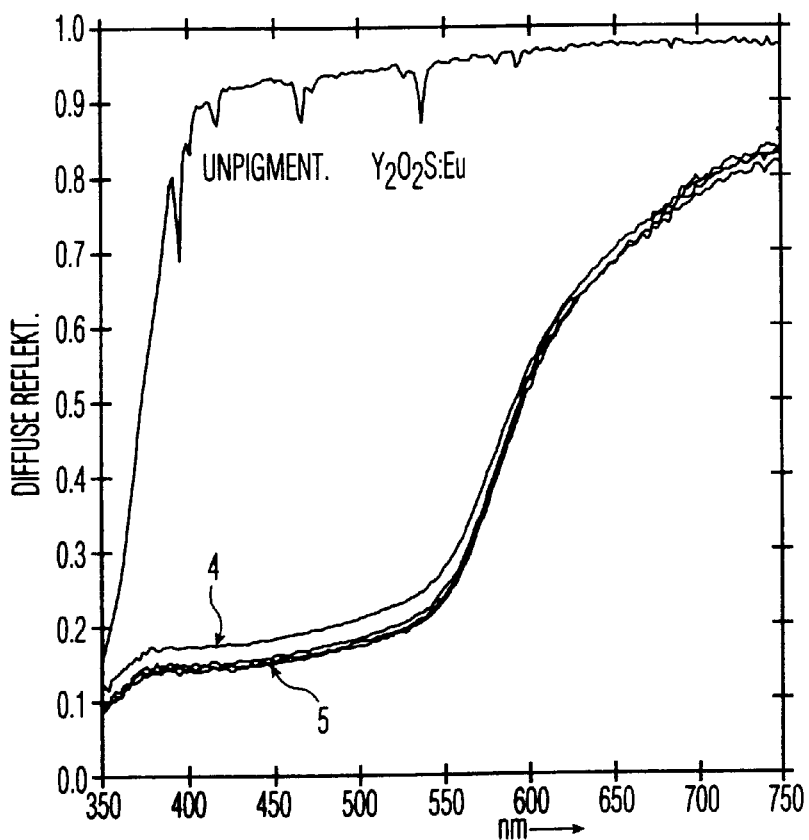
FIG. 2 shows the diffuse reflection spectra of the phosphor compositions in accordance with examples 1 to 3 (5), and of comparative example (4), and of unpigmented $Y_2O_2S$:Eu.
Figure 3:
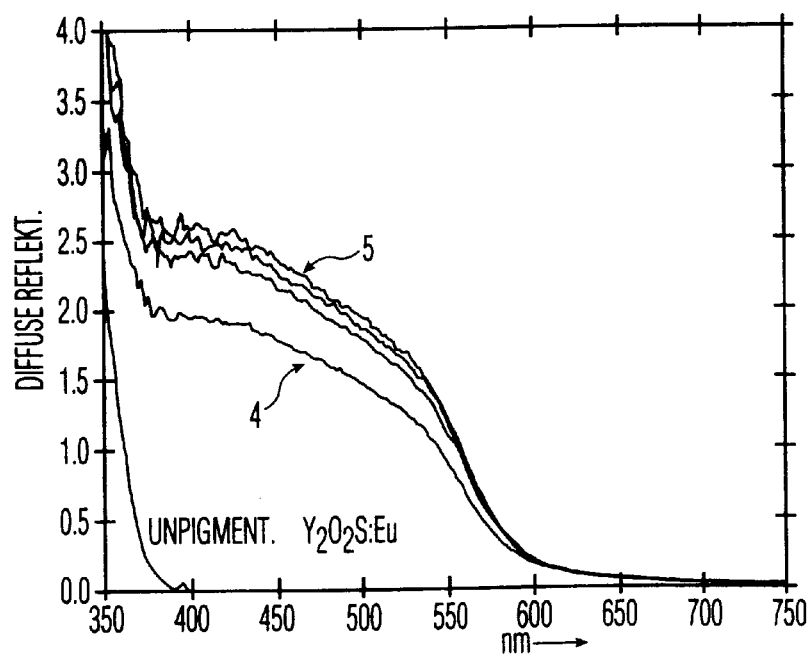
FIG. 3 shows the a/s spectra of the phosphor compositions in accordance with examples 1 to 3 (5), and of comparative example (4), and of unpigmented $Y_2O_2S$:Eu.

FIG. 2 shows the diffuse reflection spectra of the phosphor compositions listed in Table 1. The treatment in gas mixtures comprising water vapor and an oxidizing gas causes the diffuse reflectivity in the absorbing range to be reduced substantially, which is also indicated by the reduction, indicated by R(6500) in Table 1, of the reflection of black body radiation (T=6500 K). The spectral range of the red-emission of the phosphor is influenced to a smaller degree. This effect is shown even more clearly by the spectral representation of the a/s values in FIG. 3. All in all, the method in accordance with the invention results in a substantial improvement of the optical properties of the phosphor powder. This improvement is preserved when the phosphor composition is used to manufacture a display screen. The gain can be used in color display tubes to increase the contrast or to increase the brightness while the contrast remains unchanged.

We claim:

1. A method of manufacturing a phosphor composition of a phosphor comprising a pigment coating of hematite, said method including a first step in which the phosphor is coated with an iron-containing starting compound for hematite, and a second step in which the coating is calcined, thereby converting the iron-containing starting compound into hematite, characterized in that the calcining operation is carried out in an atmosphere of a gas mixture of water vapor and an oxidizing gas in which the water vapor partial pressure in the gas mixture is $\geq 25\%$ of the overall pressure.

2. A method of manufacturing a phosphor composition as claimed in claim 1, characterized in that the iron-containing starting compound for hematite is an oxide, hydroxide, hydrated oxide, sulphide or phosphate of bivalent or trivalent iron or a mixture of such compounds.

3. A method of manufacturing a phosphor composition as claimed in claim 1, characterized in that the oxidizing gas is air, oxygen, nitrogen-oxide containing gases or an oxygen-containing gas mixture.

4. A method of manufacturing a phosphor composition as claimed in claim 1, characterized in that calcining takes place in an atmosphere comprising a flowing gas mixture.

5. A method of manufacturing a phosphor composition as claimed in claim 1, characterized in that the water-vapor partial pressure in the gas mixture ranges from 60 to 80% of the overall pressure.

* * * * *